W. S. SHERMAN.
WORK CARRIAGE ALINING MEANS.
APPLICATION FILED MAR. 22, 1917.
1,289,283.
Patented Dec. 31, 1918.
2 SHEETS—SHEET 1.
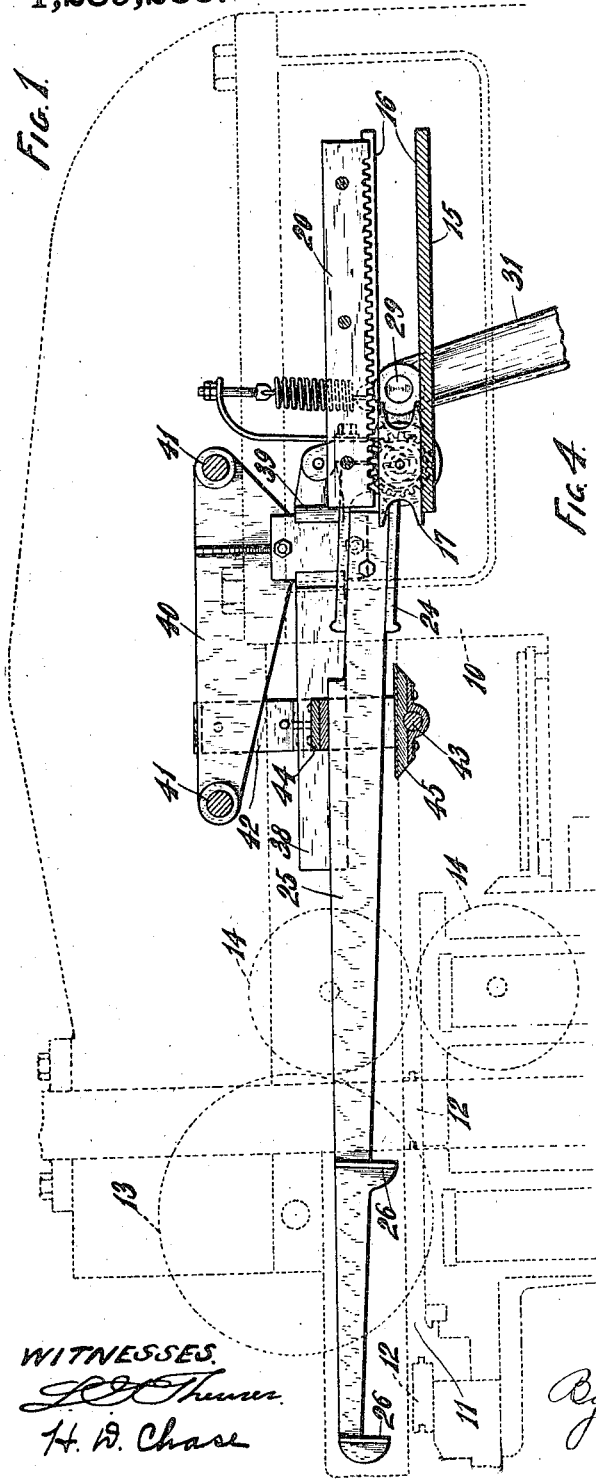
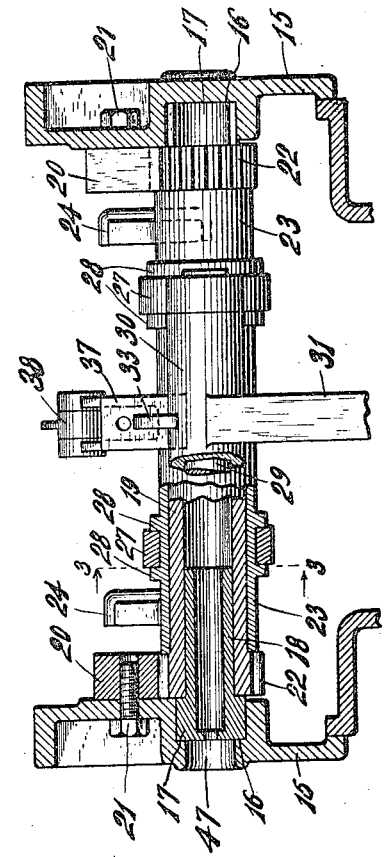
WITNESSES
INVENTOR.

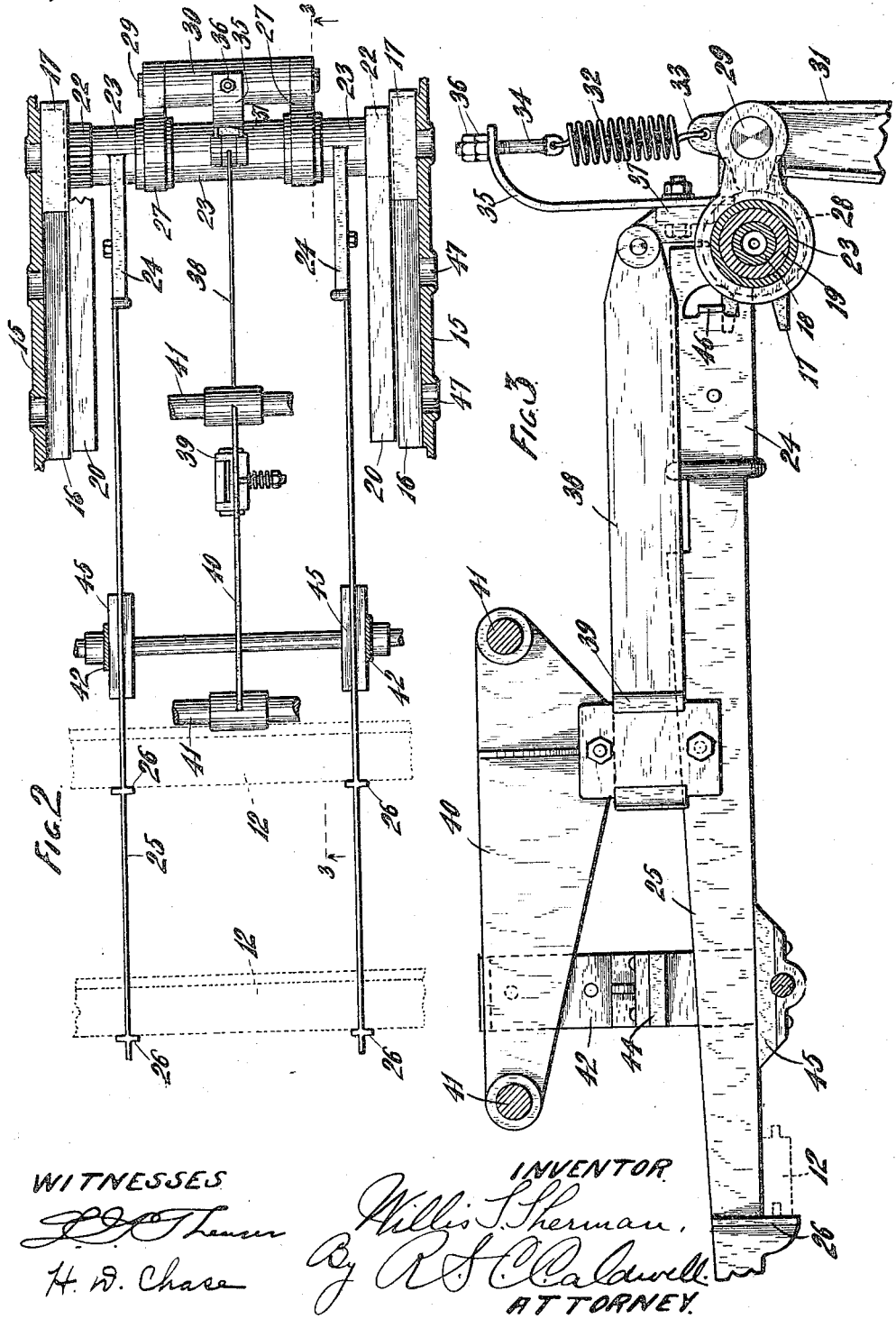

UNITED STATES PATENT OFFICE.

WILLIS S. SHERMAN, OF MILWAUKEE, WISCONSIN.

WORK-CARRIAGE-ALINING MEANS.

1,289,283.   Specification of Letters Patent.   Patented Dec. 31, 1918.

Application filed March 22, 1917. Serial No. 156,677.

*To all whom it may concern:*

Be it known that I, WILLIS S. SHERMAN, a citizen of the United States, and a resident of Milwaukee, in the county of Milwaukee and State of Wisconsin, have invented new and useful Improvements in Work-Carriage-Alining Means, of which the following is a description, reference being had to the accompanying drawings, which are a part of this specification.

This invention relates to carriage alining means for end matchers and the like and has for its object to prevent play in the carriage which may cause the work to be presented to the cutters in other than the true position for which the machine is adjusted.

In end matching machines in which the work is drawn through a work feeding passageway by means of hook bars engaging the work at distant points the hook bars have usually been pivotally mounted on a reciprocating carriage slidable in guide ways and the play of the slide in its guide ways as well as the play of the hook bars on their pivotal connections with the slide have permitted a slight warping or weaving movement of the hook bars destroying the alinement of the work under certain conditions as when the hook bars are opposed by unequal resistances.

The present invention provides for the maintenance of equality in the movement of the two sides of the carriage so that one side may not move in advance of the other and warping or weaving of the carriage and its hook bars is prevented. This is accomplished by means of a stationary rack at each side of the carriage with pinions meshing therewith and the two pinions rigidly connected together.

The invention consists in the construction and relative arrangement of certain parts and in combinations of parts hereinafter particularly described and pointed out in the claims.

In the accompanying drawings is shown an exemplifying structure embodying the invention, but it is to be understood that the invention is capable of embodiments in different forms.

Referring to the accompanying drawings in which like characters of reference indicate the same parts in different views:

Figure 1 is a side view of a work feeding carriage for end matchers embodying the present invention, parts being sectioned and the outline of the end matcher parts being shown in dotted lines;

Fig. 2 is a plan view thereof;

Fig. 3 is a sectional view on the plane of line 3—3 of Fig. 2 on a larger scale; and, Fig. 4 is a rear view of the carriage with parts sectioned.

In these drawings 10 indicates the end matcher provided with a work feeding passageway 11 through which strips of flooring 12 or other material to be operated upon are to be fed by the work feeding mechanism of this invention while firmly held between the pressure guides which form said work feeding passageway and past cutters 13 and 14 which operate on one end of the work during its travel.

Formed on or secured to the frame of the end matcher are opposite side plates 15 each having a groove 16 on its inner face and the two grooves forming parallel guide ways in which slide blocks 17 are fitted to have horizontal movement lengthwise of the machine. Each slide block 17 has a lateral projecting trunnion 18 fitting within one end of a tubular shaft 19. The tubular shaft is thus supported between the slide blocks 17 with end thrust thereagainst and is capable of turning on the trunnions. Rack bars 20 are rigidly secured in place to the side plates 15 by means of screws 21 with their teeth projecting downwardly and meshing with the teeth of pinions 22 formed at the opposite ends of the shaft 19, preferably integral therewith. Because of the pinions meshing with the stationary rack bars 20 the two slide blocks 17 are maintained in their lateral relation with each other, neither being permitted to advance beyond the other, though the carriage of which they form a part is capable of freely sliding back and forth in the guide ways 16.

A sleeve 23 surrounds the tubular shaft 19 between the pinions 22 and has grooved parallel projections forming sockets 24 in which are securely clamped a pair of work feeding hook arms 25 which extend forward in position to engage the strips of flooring 12 by means of hook lugs 26 thereon. These hook arms 25 are reciprocated by the sliding movements of the carriage and are oscillated between upper and lower positions by turning movements of the sleeve 23, as will be later described, in order to engage and advance the work during their forward stroke and in order to clear the work during their return stroke.

A pair of links 27 are loosely mounted on the sleeve 23 between flanges 28 thereof and a pin 29 connecting the ends of said links forms a connection for a tubular end 30 of an oscillating operating lever 31. This oscillating lever 31 is swung back and forth by driving mechanism not shown to produce the reciprocating movements of the carriage in its guide.

The weight of the hook arms 25 is counterbalanced by means of a coil spring 32 with one end engaged with a lug 33 on the end 30 of the operating lever 31, and the other end engaged with an adjusting screw 34 passing through a bracket 35 secured to the sleeve 23, nuts 36 being threaded on the end of the adjusting screw to regulate the tension of the spring for this purpose.

In order to raise and lower the hook arms a frictional resistance is applied to the sleeve 23 at one side of the line of draft thereof so that the vertical play of the hook arms will be taken up at the beginning of the movement of the carriage in either direction, and in the present instance this frictional resistance is applied to the sleeve above its line of draft in order that the hook arms may swing downwardly before beginning their movement to the right, which is the direction of feed of the work, and in order that the hook arms may be swung upwardly before beginning their movement to the left, which is their return movement.

An upstanding post 37 on sleeve 23, to which the bracket 35 is connected, has a pair of ears between which is pivotally mounted a friction blade 38 slidably passing between a pair of spring pressed friction jaws 39 held stationary by means of a hanger bracket 40 suspended on rods 41 which may be rigidly mounted on the machine frame. The movements of the carriage are thus resisted by the friction of the jaws 39 bearing against the opposite faces of the blade 38 and this resistance is applied to the sleeve 23 at the pivotal connection of the blade therewith.

In order to limit the vertical movements of the hook arms and to guide them in their travel, stationary brackets 42 are provided, preferably hung on the frame and having top bearing surfaces 44 to engage the upper edges of the hook arms and bottom bearing surfaces 45 for engaging the lower edges of the hook arms. These bearing surfaces are preferably cushion faced. The hook arms are so constructed that the upper edges thereof are horizontal when the hook arms are in their raised position and the lower edges are horizontal when the hook arms are in their lowered position. Thus the hooks of the hook arms travel in horizontal lines parallel to the work feeding passageway either in the feeding or the return movements of the carriage.

In operation the carriage consisting of the slides 17 and the parts mounted on them is reciprocated in the guide ways 16 as the result of the swinging movements of the oscillating lever 31 and the hook arms 25 carried by the carriage not only have these reciprocating movements but are swung vertically into and out of the work feeding passageway at the beginning of the feed stroke and the beginning of the return stroke respectively in order that they may engage and feed the strips of flooring through the work feeding passageway step by step and avoid engagement therewith on their return movements. This vertical swinging of the hook arms is caused by the turning of the sleeve 23 under the frictional resistance of the blade 38 at the time of changing direction of the carriage, the sleeve swinging as a bell crank the extent permitted by the play of the hook arms 25 between its stops before compelling the blade to slide between the friction jaws.

In a work feeding means of this character it is of extreme importance that the hooks 26 engaging the work should be in accurate alinement at right angles to the feed of the work in order that the edge of the work engaged by them may be truly positioned by means thereof and carried by them in this position past the cutters so as to produce a square cut. The least advance of one hook beyond its companion will disturb the accuracy of the machine. Consequently a racking movement of the carriage in its guides is to be carefully avoided and this is accomplished in the present construction by the provision of pinions 22 on opposite ends of the shaft 23 and meshing with the racks 20. This insures the same advance on one side of the carriage as on the other and prevents a racking movement that would throw one work arm ahead of the other.

To facilitate the accurate positioning of the hook arms they are longitudinally slidable in the grooves of the sockets 24 and the bolts which hold them have sufficient play in their openings to permit of such longitudinal adjustment, while a lug 46 bent laterally from the end of the hook arm engages the wall of an opening in the socket, as seen in Fig. 3 and the point of engagement of the latter may be readily filed to vary the effective length of the hook arm from the center of the carriage.

Openings 47 are preferably formed in the side plates 15 to permit the use of an oil can for lubricating the slides 16, the rack 20 and into the interior of the trunnions of the slides 17 which are made hollow for that purpose, and communicate with the interior of the shaft 19. In practice the sleeve 23 and the links 27 are formed in half-sections to permit of their being assembled, but they have been shown as single piece structures for clearness of illustration.

The carriage consisting of the slides with concentric shaft and sleeve is a very light construction which may be readily reciprocated without jar and with minimum wear, thus avoiding the objectionable features incident to large heavy sliding carriages that have previously been used for this purpose. Furthermore, the rack and pinion carriage equalizing means avoids the necessity for a long bearing for the carriage to prevent racking and consequently the guides may be made shorter for the same travel of the carriage with a consequent reduction in size of the frame of the machine. The light weight carriage is capable of quicker movement and permits other parts to be made lighter since its movements are accomplished with less momentum and consequently with less stress upon the other parts of the machine.

I desire it to be understood that this invention is not limited to any specific form or arrangement of parts except in so far as such limitations are specified in the claims.

What I claim as new and desire to secure by Letters Patent is:

1. A work feeding carriage; guide ways therefor; means for reciprocating the carriage in the guide ways; and means for assuring the equal advance of both sides of the carriage, comprising a shaft carried by the carriage, pinions thereon, and stationary racks engaged by the pinions; means on the carriage for engaging the work; and a cutter in the path of the work.

2. A work feeding means for end matchers and the like, comprising a carriage traveling in ways, means for reciprocating the carriage in its ways, means on the carriage for engaging work, a cutter in the path of the work, and means for assuring the equal advance of both sides of the carriage, comprising a shaft mounted on the carriage, pinions on the shaft, and stationary racks on each side of the carriage engaged by the pinions.

3. A work feeding means for end matchers and the like, comprising guides, slides fitting in the guides, a shaft connecting the slides, pinions on the shaft, stationary racks engaged by the pinions, said shaft and slides forming together a reciprocating carriage, means for moving the carriage, and work engaging means carried by the carriage.

4. A work feeding means for end matchers and the like, comprising guides, slides mounted therein, a shaft mounted on the slides, pinions on the shaft, stationary racks engaged by the pinions, a sleeve on the shaft and forming with the shaft and slides a reciprocating carriage, means for moving the carriage, and work engaging means on the sleeve.

5. A work feeding means for end matchers and the like, comprising guides, slides fitting therein, a shaft mounted on the slides, pinions on the ends of the shaft, stationary racks engaged by the pinions, a sleeve surrounding the shaft and forming with the shaft and slides a reciprocating carriage, means for moving the carriage, work engaging means mounted on the sleeve, a friction blade having connection with the sleeve, and stationary friction means engaging the friction blade for oscillating the sleeve to swing the work engaging means when the carriage changes its direction of movement.

6. A work feeding means for end matchers and the like, comprising guides, slides fitting therein and provided with trunnions, a tubular shaft rotatably mounted on the trunnions of the slides and forming a connection between them, pinions on the ends of the shaft, stationary racks engaged by the pinions, said shaft and slides forming a reciprocating carriage, means for moving the carriage, and work engaging means carried by the carriage.

7. A work feeding means for end matchers and the like, comprising guides, slides fitting in the guides, a shaft mounted on the slides, pinions on the ends of the shaft, stationary racks engaged by the pinions, a sleeve surrounding the shaft and forming with the shaft and the slides a reciprocating carriage, means for moving the carriage, work engaging means carried by the sleeve, and means for oscillating the sleeve for swinging the work engaging means.

8. A work feeding means for end matchers and the like, comprising guides, slides fitting therein, a shaft connecting the slides, pinions on the ends of the shaft, stationary racks engaged by the pinions, a sleeve surrounding the shaft and forming with the shaft and slides a reciprocating carriage, work engaging means carried by the sleeve, links surrounding the sleeve, a pin connecting the links, and an operating lever connected with the pin for reciprocating the carriage.

9. A work feeding means for end matchers and the like, comprising guides, slides fitting in the guides, a shaft connecting the slides, pinions on the ends of the shaft, stationary racks engaged by the pinions, a sleeve surrounding the shaft and forming with the shaft and the slides a reciprocating carriage, work engaging means mounted on the sleeve, means for moving the carriage, and means for counterbalancing the work engaging means.

10. A work feeding means for end matchers and the like, comprising guides, slides fitting in the guides, a shaft connecting the slides, pinions on the ends of the shaft, stationary racks engaged by the pinions, a sleeve surrounding the shaft and forming with the shaft and the slides a reciprocating carriage, work feeding hook arms carried by the sleeve, a friction means connected with the sleeve, an operating lever connected with the sleeve, and a counterbalancing spring connecting the sleeve with the operating lever.

11. A work feeding means for end matchers and the like, comprising guides, slides fitting in the guides, a shaft connecting the slides, pinions on the ends of the shaft, stationary racks engaged by the pinions, a sleeve surrounding the shaft and forming with the shaft and the slides a reciprocating carriage, means for moving the carriage, hook arms mounted on the sleeve, means for frictionally resisting the travel of the sleeve at one point thereof for causing the sleeve to turn and swing the hook arms when the carriage changes its direction of movement, and stops for limiting the swinging movements of the hook arms and guiding the reciprocating movements of the hook arms.

12. A work feeding means for end matchers and the like, comprising guides, a carriage fitting in the guides, means for reciprocating the carriage, oscillating hook arms mounted on the carriage, and stationary stops engaged by the hook arms for limiting their oscillating movements.

13. A work feeding means for end matchers and the like, comprising guides, a carriage fitting in the guides, means for reciprocating the carriage, oscillating hook arms pivotally mounted on the carriage, and stationary stops engaged by the hook arms for limiting their oscillating movements, the bearing surfaces of the hook arms in contact with the stops being angular with relation to each other to cause straight line movements of the hook arms when engaged with either stop.

In testimony whereof, I affix my signature, in presence of two witnesses.

WILLIS S. SHERMAN.

Witnesses:
  R. S. C. CALDWELL,
  H. D. CHASE.

Copies of this patent may be obtained for five cents each, by addressing the "Commissioner of Patents, Washington, D. C."